United States Patent
Lofberg et al.

(10) Patent No.: US 10,494,225 B2
(45) Date of Patent: Dec. 3, 2019

(54) CONTROL PANEL WITH ACCESSIBILITY WHEEL

(71) Applicant: Kone Corporation, Helsinki (FI)

(72) Inventors: Niklas Lofberg, Helsinki (FI); Jussi Hiltunen, Helsinki (FI); Jussi Laurila, Helsinki (FI)

(73) Assignee: Kone Corporation, Helsinki (FI)

( * ) Notice: Subject to any disclaimer, the term of this patent is extended or adjusted under 35 U.S.C. 154(b) by 95 days.

(21) Appl. No.: 15/797,009

(22) Filed: Oct. 30, 2017

(65) Prior Publication Data

US 2018/0127234 A1    May 10, 2018

Related U.S. Application Data

(63) Continuation of application No. PCT/EP2015/061151, filed on May 20, 2015.

(51) Int. Cl.
*B66B 1/34*    (2006.01)
*B66B 1/46*    (2006.01)
*B66B 3/00*    (2006.01)
*G06F 3/01*    (2006.01)
*G06F 3/0488*  (2013.01)

(52) U.S. Cl.
CPC .............. *B66B 1/463* (2013.01); *B66B 3/002* (2013.01); *G06F 3/016* (2013.01); *G06F 3/0488* (2013.01)

(58) Field of Classification Search
CPC .... G06F 3/016; G06F 3/0488; G06F 3/03547; G06F 3/0485; G06F 2203/013; G06F 2203/014; G06F 2203/0331; G06F 3/0414; G06F 2221/2109; G06F 3/03549; G06F 2203/04104; G06F 2200/1636; G06F 2200/1637; G06F 2203/04105; B66B 1/463; B66B 3/002
USPC .................................................. 345/173–175
See application file for complete search history.

(56) References Cited

U.S. PATENT DOCUMENTS

| | | | | |
|---|---|---|---|---|
| 5,679,933 A | * | 10/1997 | Weber ..................... | B66B 1/462 187/389 |
| 8,763,762 B2 | * | 7/2014 | Finschi ................... | B66B 1/468 187/391 |
| 9,007,323 B2 | * | 4/2015 | Araki ...................... | G06F 3/016 178/18.01 |
| 9,857,872 B2 | * | 1/2018 | Terlizzi .................. | G06F 3/016 |
| 2007/0057167 A1 | | 3/2007 | MacKey et al. | |

(Continued)

FOREIGN PATENT DOCUMENTS

WO    WO-2005121003 A2    12/2005
WO    WO-2007/046807 A1    4/2007

OTHER PUBLICATIONS

International Search Report PCT/ISA/210 for International Application No. PCT/EP2015/0621151 dated Feb. 1, 2016.

(Continued)

*Primary Examiner* — Duc Q Dinh
(74) *Attorney, Agent, or Firm* — Harness, Dickey & Pierce, P.L.C.

(57) ABSTRACT

The invention concerns a control panel for an elevator system, the panel having an electronic control unit to which a touch sensitive screen as an interface available to a user is connected, the touch screen having incorporated a user accessibility-wheel which is felt haptic for the user, wherein an elevator command can be entered by means of the accessibility-wheel.

6 Claims, 2 Drawing Sheets

(56) References Cited

U.S. PATENT DOCUMENTS

Figure 1:
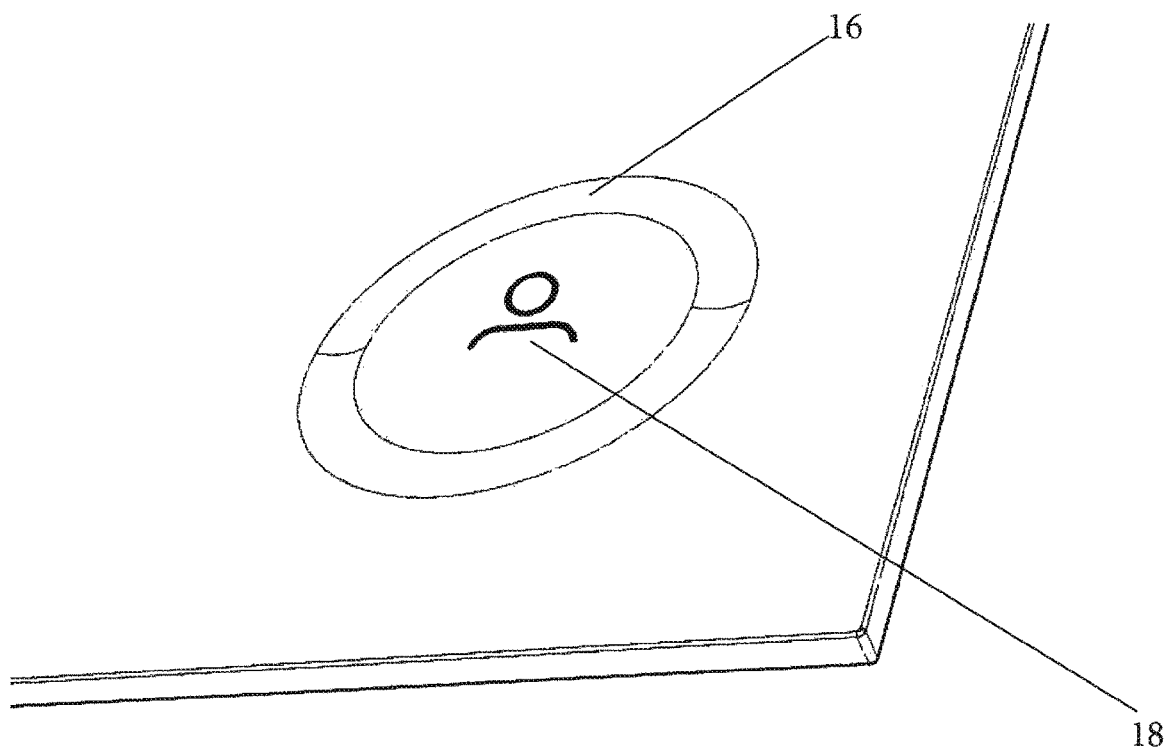

2010/0053104 A1* 3/2010 Ahn .................... G06F 3/04883
                                                        345/173
2014/0375580 A1   12/2014 Peshkin et al.

OTHER PUBLICATIONS

Written Opinion of the International Searching Authority PCT/ISA/237 for International Application No. PCT/EP2015/0621151 dated Feb. 1, 2016.

* cited by examiner

CONTROL PANEL WITH ACCESSIBILITY WHEEL

This application is a continuation of PCT International Application No. PCT/EP2015/061151 which has an International filing date of May 20, 2015, the entire contents of which are incorporated herein by reference.

FIELD OF THE INVENTION

The present invention relates to a car control panel for an elevator for which inter alia a touch screen is made use of to enter commands.

BACKGROUND OF THE INVENTION

Passengers using elevators can generally give calls to elevators either in an elevator car, on a floor station site or in an elevator lobby. Elevator stations are typically provided with up/down pushbuttons, by means of which a passenger can order an elevator to the call floor and simultaneously indicate his/her travel direction. After the elevator has arrived at the call-giving floor, the passenger moves into the elevator car and indicates his/her destination floor with the pushbuttons of the car panel in the elevator car. A destination call-giving device can be provided with a numeric keypad and a display means, too. Taking reference to visually disabled or handicapped people it is known to implement a destination floor registration device for offering arbitrary floor information and destination floor information in Braille or the like by using a Braille display. The device includes an operating panel having touch-panel operation buttons, a panel display constituted by a touch panel of the operating panel, and a sheet-shaped Braille display that is provided integrally with or separately from the display cover and arbitrarily enables Braille notation. It is configured so that when the Braille display or the display cover near the Braille display is depressed by pressing the Braille display or the display cover, the touch panel is operated.

Also, conventionally, as a destination floor registration device of an elevator for allowing a visually disabled person which has difficulties to understand Braille characters to operate buttons on an operating panel (destination floor registration device) of an elevator without anxiety, there is known a destination floor registration device in which sign parts expressing the indication contents of operation buttons in Braille are provided for the operation buttons on the operating panel of the elevator, and the indication contents of a touched sign part are told by means of voice by using a loudspeaker.

In case a touch screen is used as the operation panel, the signalization of it has been considered as a weak solution for the blind and visually impaired users and therefore an additional solution like one of the above prior art devices are preferred. This fact has limited the growth of the touch technology use in elevator signalization use even though it has a great business potential and benefits to the big majority of the users and clients. A disadvantage of these car operating panels consisting in a touch screen is however, that they do not conform to the standards concerning handicapped people, in particular those prescribed for elevator installations. If a handicapped or blind person touches the elevator touch screen, an elevator call is maybe placed without the will of that person and without the perception of that person that an elevator call has been actually placed. According to the standards EN 81-70 and ISO/DIS 4190-5, there are requirements to be fulfilled as for example an operating and registration feedback and floor numbers in relief to be able be recognized by a visually handicapped user. It is desirable therefore to develop a command panel being conform to the standards concerning handicapped people and which is practical, inexpensive and fast.

AIM OF THE INVENTION

The object of the invention is to provide a practical, inexpensive and fast solution for a single concept of a control panel for elevators the operation of which can be conveniently used for both, a visual handling and a non-visual handling for visually impaired users.

SUMMARY OF THE INVENTION

The above object is achieved by claim 1. Advantageous embodiments are disclosed in the respective subclaims. The invention further concerns an elevator according to claim 6 including such panel technology.

Basic idea of the invention is to realize a control panel for an elevator the command input of which is realized by means of a touch screen being used as an interface for entering elevator commands. The touch screen is configured such that there is at least an accessibility wheel implemented within the area of the touch screen which is intended to be conveniently usable for visual impaired persons.

Said accessibility wheel can be combined with conventional push-buttons being implemented within the touch screen panel—but this is not a must since the wheel as such makes it possible to realize a great number of elevator commands in itself. So, the touch screen can comprise areas for call-buttons as for a visual handling by means of which a passenger can order an elevator to the call floor and/or indicate his/her travel direction as also for other known functions for the elevator like 'open door', 'close door', 'emergency call', etc. These functions however can be also triggered parallel by means of the accessibility wheel. For this aim, a contact/motion module of the touch screen includes various software components for performing these various operations related to a detection of contact, such as determining if a contact has occurred, determining if there is a movement of the contact and tracking the movement across the accessibility wheel and/or the touch screen button(s), and determining if the contact has been broken (i.e., if the contact has ceased). Determining movement of the point of contact may include determining speed (magnitude), velocity (magnitude and direction), and/or an acceleration (a change in magnitude and/or direction) of the point of contact.

The accessibility wheel being arranged as a touch sensitive surface on the screen surface of the call panel is a user-interface device that may provide navigation commands based on an angular displacement of the point of contact with the wheel by a user of the device. User commands and navigation commands provided by the user via the accessibility wheel may be processed by an accessibility wheel controller as well as one or more of the modules and/or sets of instructions in a memory.

The panel has touch sensor(s) that detect a location (X-Y) of a user's finger touch. As regards those sensors, it is not a must to install separate sensors for the call buttons and the wheel, instead the same touch sensor(s) can be used for detecting user's touch of call buttons and the wheel.

To be recognizable for a visually impaired user, the accessibility wheel can be felt haptic. This is realized in that the wheel is made as a grooved wheel or embossed wheel on the surface of the touch screen. The recessed or embossed haptic wheel shape on the surface of the touch screen can thus be recognized and its shape is felt easily by touching it with a finger. The basic idea of the invention therefore means to have a haptic circle on the touch screen surface of a control panel for entering elevator control commands for visually impaired users. However, the accessibility wheel of course can be used by non-blind persons, too.

Touching the wheel will activate a high accessibility mode which includes an audio feedback by means of a speaker and/or haptic feedback like vibration. By scrolling a finger in the haptic wheel the user is able to browse the commands, i.e. a destination floor with audio support or haptic feedback vibration. An elevator call to a destination floor is for example created when the user releases the finger from the wheel. The user's action is thereby accompanied and guided, since the actual status of the activated command as offered by the panel is made audible via a speaker or is made felt as a haptic feedback by vibration.

Using the accessibility wheel means to put a finger onto the grooved or embossed circle and to start moving the finger along it. After each (specified) movement of the finger (for example every "90 degrees") a destination target floor is incremented by one (finger is moved clockwise) or decremented by one (finger is moved counter clockwise). Every time when the destination target is incremented or decremented there is a voice announcement and/or haptic feedback like a short vibration on the touchscreen surface. For example if the user is in floor 3, and he touches the groove first time, announcement would be "three", and after that "four", "five" . . . "seven". Now if the user releases his touch, a destination call from floor 3 to floor 7 would be generated. In some cases as for example in high buildings it would be of benefit to use bigger floor increments (for example 5 or 10 floors) if a user moves his finger fast enough (i.e. finger speed is above a specified speed), or an increment or decrement of floor number could be even proportional to the finger speed.

According to a preferred embodiment the determined command is independent of the initial location of the finger where the contact on the accessibility wheel has been made. The accessibility wheel solely counts the way the finger passes around, i.e. the relative movement of the finger and it is the relative movement choosing the offered command. The command itself can alternatively then be triggered by a separate action of the user, for example by pushing his finger on specific area of the screen or especially on a specific area of the accessibility wheel. Such specific area can be exactly the position of his finger at which he got the command offered so that he then would have to press down his finger with greater force onto the wheel to trigger and to activate the command.

The accessibility wheel may also be used in a preferred embodiment to provide a user command corresponding to a selection of one or more items, for example, when the user of the device presses down on the centre of the wheel to therewith trigger a specific function.

According to a convenient embodiment the touch screen can be a display screen able to display for example a symbol, an alphanumeric digit or a graphical information which display may use LCD (liquid crystal display) technology, or LPD (light emitting polymer display) technology, although other display technologies may be used. A touch screen in combination with the display screen and a display controller may detect the contact and any movement or breaking thereof using any of a plurality of touch sensing technologies, including but not limited to capacitive, resistive (=force sensor), infrared, and surface acoustic wave technologies, as well as other proximity sensor arrays or other elements for determining one or more points of contact with a touch screen in the display system.

The command panel is then configured to display on its display screen pushbutton-area(s) to receive various running operation commands via pushdown-touching when pushed for example by the finger of an elevator user. Thus, the screen image being displayed can be an ordinary screen display in which buttons for an ordinary car operation, such as registration of a destination floor, opening of a car door, closing thereof and the like, make appearance, and possibly even a character input screen image in which buttons capable of inputting characters like a keypad can make appearance.

According to such embodiment, when the accessibility wheel is integrated into the display touch screen panel the wheel itself can be displayed on the screen additionally to be felt haptic as described above. In this case the device displays an image that can include the digits of the destination floor possibly arranged in a circle while simultaneously the digits are made audible via a speaker for visual handicapped people or are linked with a haptic reaction like a vibration.

The elevator control panel pertaining to this invention is either disposed inside an elevator car or on a floor platform or lobby and is used for the running operation of the elevator. The commands as made with the control panel may be communicated over one or more communication buses or signal lines with an elevator control.

In the following the invention is disclosed as an exemplified embodiment as shown in FIG. 1.

FIG. 1 reveals part of a touch screen of a control panel for an elevator which touch screen is in combination with a display screen. Beside the visual display of the accessibility wheel as shown in the form of a circle, the same is also made felt haptic by realizing a grooved circle on the display surface. The centre of the accessibility wheel is configured as a push-down button 18 for triggering a specific command.

Figure 2:
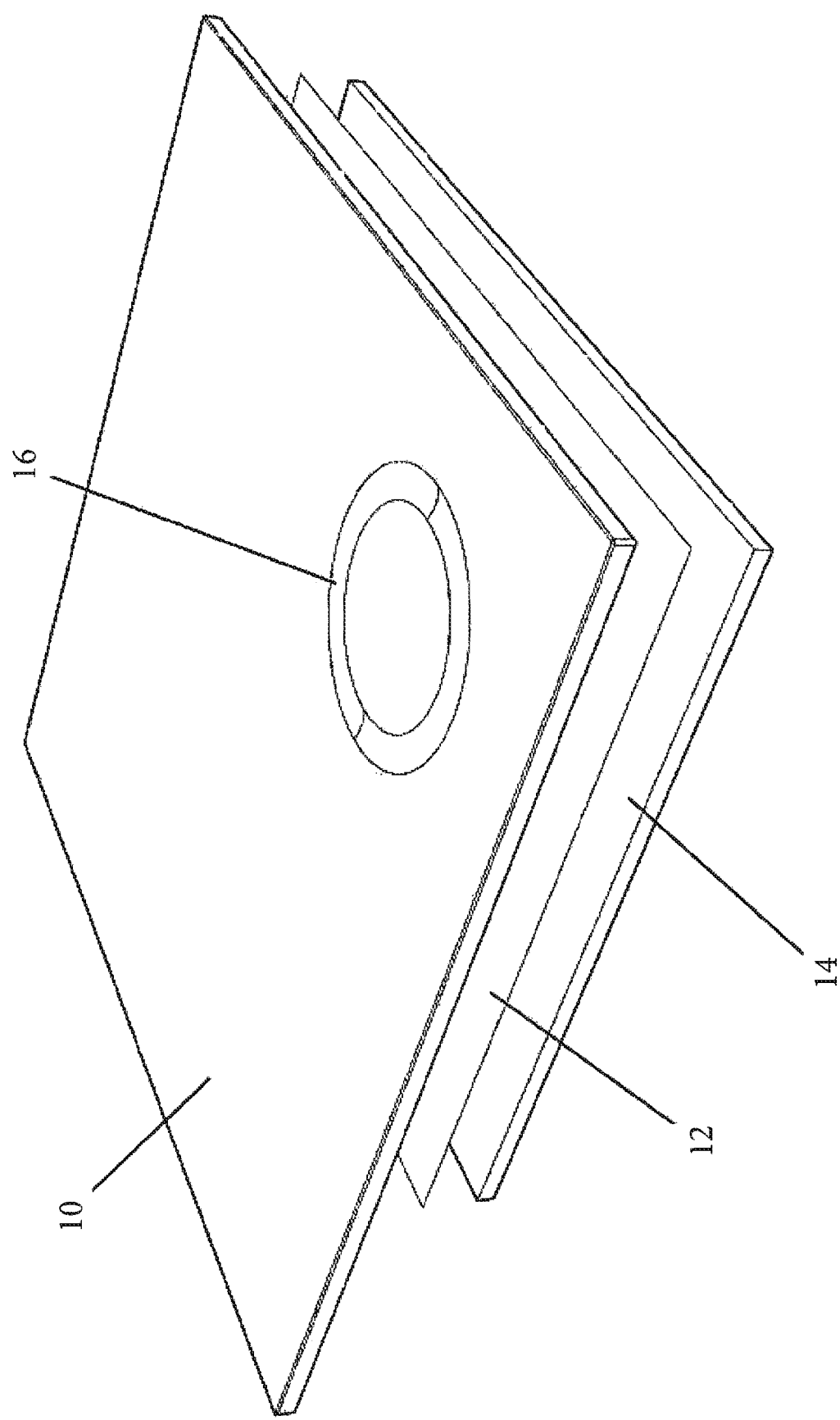

FIG. 2 shows a schematic figure of the inventive control panel with parts extracted in exploded view. The reference numbers concern a glass lens 10, a capacitive touch foil 12 below and a display 14. The said accessibility wheel as recessed haptic wheel in question is characterized with numeral 16.

The invention claimed is:
1. A control panel for an elevator system, comprising:
an electronic control unit; and
a touch sensitive touch screen, the touch sensitive touch screen connected to the electronic control unit, the touch sensitive touch screen configured to provide a user interface, the touch sensitive touch screen including an incorporated user accessibility wheel which is configured to provide haptic feedback to a user, the touch sensitive touch screen configured to enable an elevator command to be entered based on user interaction with the user accessibility wheel,
wherein the user accessibility wheel is a touch sensitive surface that is configured to provide the elevator command based on an angular displacement of a point of contact around the user accessibility wheel by the user,
wherein the user accessibility wheel is configured to provide a separate instance of haptic feedback in response to each incrementing of the angular displacement by a particular angular distance around the user accessibility wheel.

2. The control panel according to claim 1, further comprising:
a speaker configured to provide an audible indication of an actual status of the elevator command as offered by the control panel.

3. The control panel according to claim 1, wherein the touch sensitive touch screen includes at least one pushdown-button-area configured to enable user-initiated entering of a control command based on user interaction with the at least one pushdown-button-area.

4. The control panel according to claim 1, wherein the user accessibility wheel includes a grooved wheel or an embossed wheel on a surface of the touch sensitive touch screen.

5. The control panel according to claim 1, wherein the touch sensitive touch screen includes a display screen.

6. An elevator with a control panel according to claim 1.

* * * * *